A. B. RYPINSKI.
METHOD OF CONNECTING PLATES BY ELECTRICAL RIVETING.
APPLICATION FILED AUG. 26, 1919.

1,329,144.

Patented Jan. 27, 1920.

Albert B. Rypinski
Inventor
By his Attorney

UNITED STATES PATENT OFFICE.

ALBERT B. RYPINSKI, OF BROOKLYN, NEW YORK, ASSIGNOR TO THOMAS E. MURRAY, OF NEW YORK, N. Y.

METHOD OF CONNECTING PLATES BY ELECTRICAL RIVETING.

1,329,144.     Specification of Letters Patent.     Patented Jan. 27, 1920.

Application filed August 26, 1919. Serial No. 319,917.

*To all whom it may concern:*

Be it known that I, ALBERT B. RYPINSKI, a citizen of the United States, residing at Brooklyn, in the county of Kings and State of New York, have invented a certain new and useful Improvement in Methods of Connecting Plates by Electrical Riveting, of which the following is a specification.

Where a metal plate is to be united by riveting to a non-metal plate (the term "non-metal" here including glass, cement or porcelain, wood, rubber, fiber or the like) if the protruding end of the rivet is compressed or upset by hammering or strong mechanical pressure, it frequently happens that the non-metal plate is broken or cracked. This is common when said plate is of porcelain or fictile material, and even when the plate is of wood or fiber, the hammering or compression of the rivet is liable to force the upset portion into the material, and so make an unsightly job.

My present invention is a method of connecting two plates, as aforesaid, by electrical riveting, without any danger of injury to the non-metal plate, and consists in the steps more particularly set forth in the claim.

In the accompanying drawings—

Figure 1:
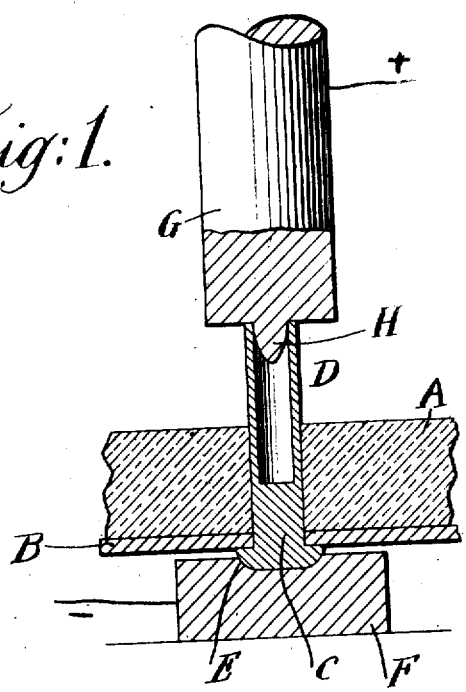
Figure 2:
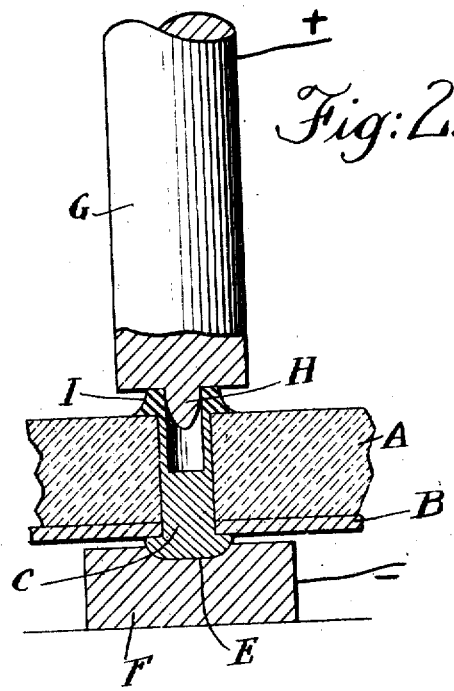
Figure 3:
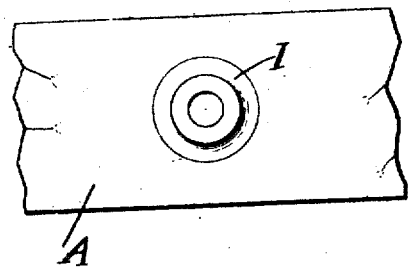

Figures 1 and 2 are vertical sections of two plates, respectively of glass or porcelain and metal, to be united, the electrodes and the rivet in place. Fig. 1 shows the position of the parts before, and Fig. 2, after, the riveting operation. Fig. 3 is a plan view of one side of the glass or porcelain plate, showing the electrically made head of the rivet, after the operation is completed.

Similar letters of reference indicate like parts.

A is a non-metal plate of glass, porcelain, fiber, rubber or other non-metallic material, to which the metal plate B is to be united. Through said plates, I form a hole to receive the shank of the tubular metal rivet C. A part D of said rivet protrudes beyond the plate A, and the head E of the rivet lies against said plate. F is a fixed electrode, in contact with which the rivet head E is placed, or said head may lie in a suitably formed recess or countersink in said electrode. G is a vertically movable electrode having on its under side a centering pin H adapted to enter the rivet C.

The plates A, B and rivet C being disposed, as shown, upon the fixed electrode F and below the movable electrode G, the pin H is introduced into rivet C and the lower face of said electrode G is caused to contact with the end of said rivet. When the current is established to said electrodes and through the rivet, the protruding part D of the rivet will become highly heated and softened, while the remainder will continue comparatively cool and hard. This is due partly to the thinness of the tubular part D, whereby the current becomes concentrated thereat, and partly to the conduction of the heat from the rivet head to the adjacent metal parts. The movable electrode G being now forced downwardly, the protruding portion D of the rivet is compressed to form an annular head I, Fig. 2, which is in close contact with the surface of plate A, so that the plates A and B are tightly held together between said head I and the head E.

It will be apparent from the foregoing that after the part D of the rivet is heated and softened, but very little pressure of the movable electrode is required to compress said softened metal and to form the annular head I. Wood, rubber or fiber are abundantly hard to support the head I during its production, so that no indentation of these materials takes place, and as there is no shock or blow delivered upon the rivet, no breakage or cracking of the non-metal plate A occurs.

This mode of fastening has the further advantage of being independent of slight variations in thickness of the non-metal plate A—such as are commonly found in plates of glass, porcelain or the like—since the softened metal of head I adapts itself to any thickness of plate upon which it is formed and to inequalities of the surface thereof. The cooling of the rivet causes it to contract, and so to aid in retaining the plates closely together.

I claim:

The method of uniting a metal plate to a non-metal plate, which consists in forming registering openings in both plates, inserting in said openings a tubular metal rivet with its head in contact with said metal plate and its shank protruding beyond said non-metal plate, placing said plates and rivet between electrodes, establishing current through said rivet to heat and soften the protruding portion of said shank, and compressing said portion while so softened to form a head in contact with said non-metal plate.

In testimony whereof I have affixed my signature in presence of two witnesses.

ALBERT B. RYPINSKI.

Witnesses:
 GERTRUDE T. PORTER,
 MAY T. McGARRY.